(12) United States Patent
Munjurulimana et al.

(10) Patent No.: US 12,448,049 B2
(45) Date of Patent: Oct. 21, 2025

(54) HYBRID ROCKER REINFORCEMENT FOR SMALL OVERLAP IMPACT

(71) Applicant: SABIC Global Technologies B.V., Bergen op Zoom (NL)

(72) Inventors: Dinesh Munjurulimana, South Lyon, MI (US); Dhanendra Kumar Nagwanshi, Novi, MI (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 373 days.

(21) Appl. No.: 18/011,981

(22) PCT Filed: Jun. 23, 2021

(86) PCT No.: PCT/EP2021/067082
§ 371 (c)(1),
(2) Date: Dec. 21, 2022

(87) PCT Pub. No.: WO2021/259971
PCT Pub. Date: Dec. 30, 2021

(65) Prior Publication Data
US 2023/0278636 A1     Sep. 7, 2023

Related U.S. Application Data
(60) Provisional application No. 63/043,782, filed on Jun. 25, 2020.

(51) Int. Cl.
*B62D 25/02*     (2006.01)
*B62D 21/15*     (2006.01)
(Continued)

(52) U.S. Cl.
CPC ......... *B62D 25/025* (2013.01); *B62D 21/152* (2013.01); *B62D 29/004* (2013.01); *B62D 27/02* (2013.01)

(58) Field of Classification Search
CPC .... B62D 25/04; B62D 25/025; B62D 21/152; B62D 21/157; B62D 19/001;
(Continued)

(56) References Cited

U.S. PATENT DOCUMENTS 8,864,216 B2 † 10/2014 Nagwanshi
9,849,915 B2 * 12/2017 Lauer ................... B62D 21/152
(Continued)

FOREIGN PATENT DOCUMENTS

DE     102007025930 A1 * 12/2008 ....... B29C 45/14778
DE     10-2012-206-032 A1 † 10/2013
(Continued)

OTHER PUBLICATIONS

DE102007025930 Text (Year: 2008).*
(Continued)

*Primary Examiner* — Dennis H Pedder
(74) *Attorney, Agent, or Firm* — CANTOR COLBURN LLP

(57) ABSTRACT

An apparatus for providing structural support for a vehicle, the apparatus comprising a rocker panel component defining a channel extending along an axis, a partition disposed in the channel to define a first channel portion and a second channel portion, a first plastic reinforcement disposed in the first channel portion and coupled to the rocker panel component, the first plastic reinforcement defining a plurality of voids such that the first plastic reinforcement plastically deforms under a load at a first rate of deformation along the axis, a second plastic reinforcement disposed in the second channel portion and coupled to the rocker panel component, the second plastic reinforcement defining a plurality of voids such that the second plastic reinforcement plastically deforms under the load at a second rate of deformation along (Continued)

the axis, wherein the first rate of deformation is different than the second rate of deformation.

16 Claims, 12 Drawing Sheets

(51) Int. Cl.
*B62D 29/00* (2006.01)
*B62D 27/02* (2006.01)

(58) Field of Classification Search
CPC .. B62D 19/005; B62D 19/004; B62D 27/023; B62D 27/026; B60Y 2300/01
USPC .......... 296/193.01, 209, 901.01, 187.01, 205
See application file for complete search history.

(56) References Cited

U.S. PATENT DOCUMENTS

| | | | |
|---|---|---|---|
| 10,155,542 B2 † | 12/2018 | Gao | |
| 10,293,860 B1 * | 5/2019 | Cooper | B62D 25/025 |
| 10,926,804 B2 * | 2/2021 | Yang | B62D 25/025 |
| 2014/0265443 A1 * | 9/2014 | Meaige | B62D 25/025 296/187.02 |
| 2017/0072884 A1 * | 3/2017 | Zannier | B60R 19/18 |

FOREIGN PATENT DOCUMENTS

| | | |
|---|---|---|
| EP | 1806271 A2 † | 7/2007 |
| EP | 2655169 B1 | 9/2015 |
| EP | 2945838 B1 | 2/2019 |
| EP | 3224120 B1 | 3/2019 |
| EP | 3154828 B1 | 1/2020 |
| FR | 3076526 A1 | 7/2019 |
| WO | 2015136476 A1 | 9/2015 |

OTHER PUBLICATIONS

International Search Report for International Application No. PCT/EP2021/067082; International Filing Date Jun. 23, 2021; Date of Mailing Sep. 8, 2021; 4 pages.
Written Opinion for International Application No. PCT/EP2021/067082; International Filing Date Jun. 23, 2021; Date of Mailing Sep. 8, 2021; 8 pages.

\* cited by examiner
† cited by third party

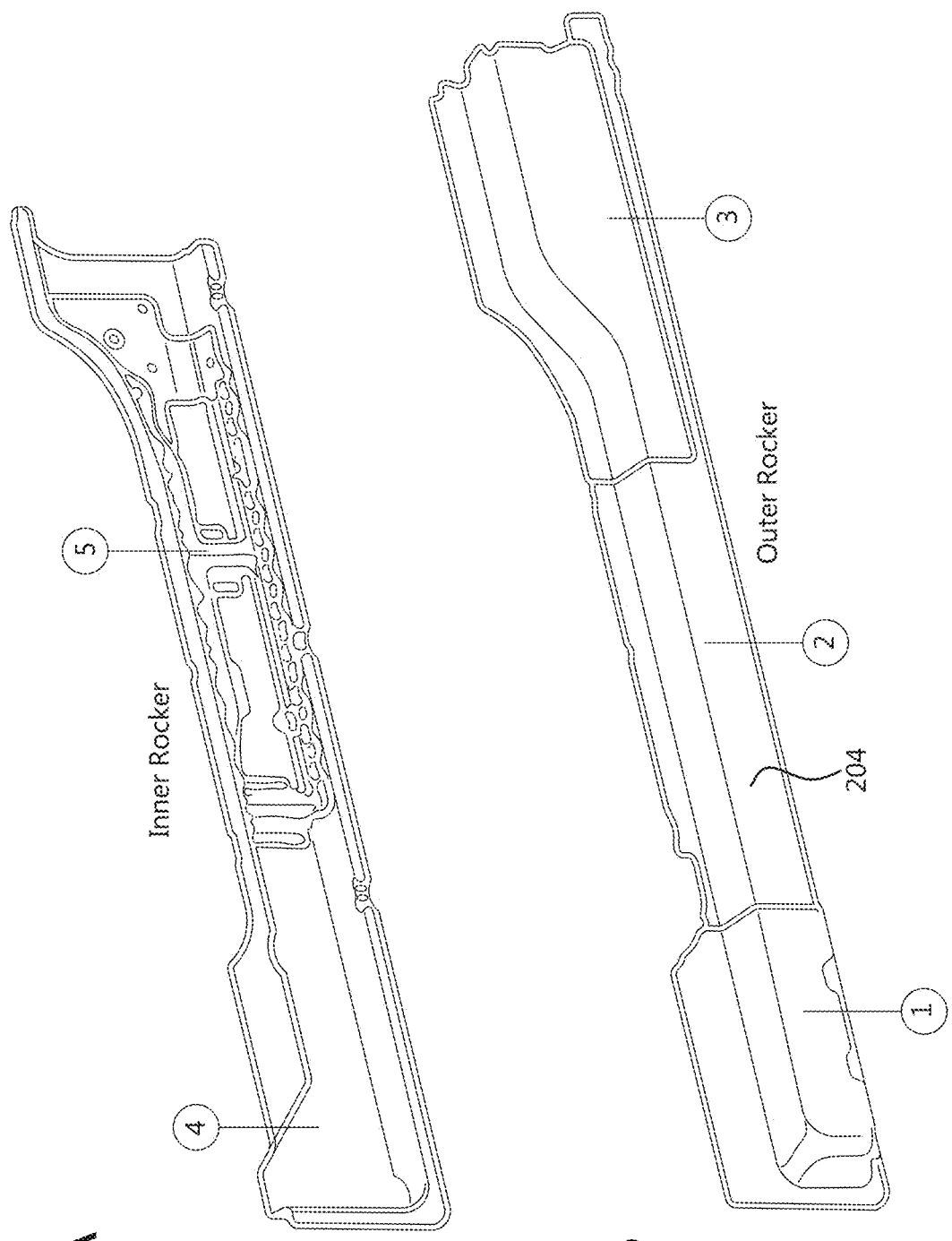

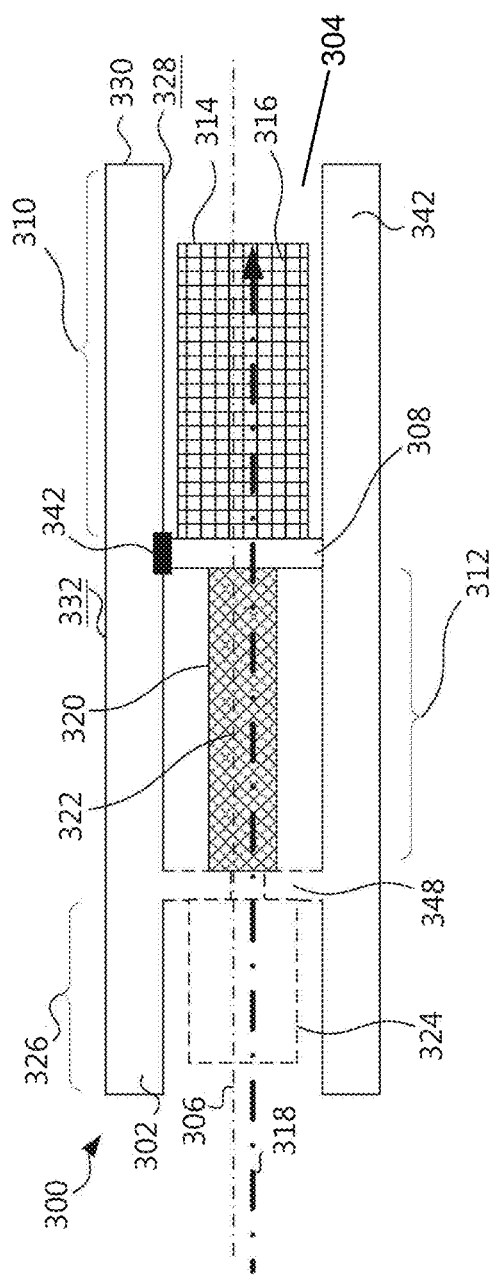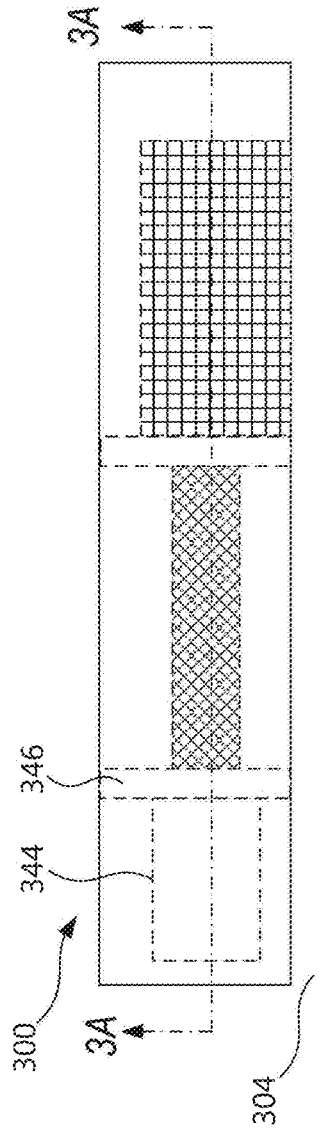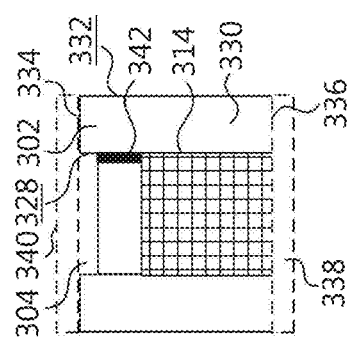

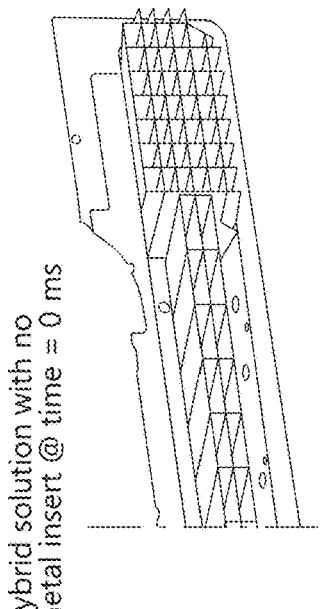
Fig. 9A
Incumbent @ time = 0 ms
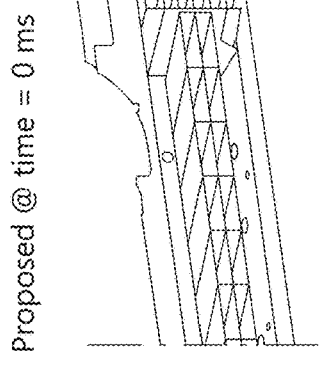
Fig. 9B
Proposed @ time = 0 ms
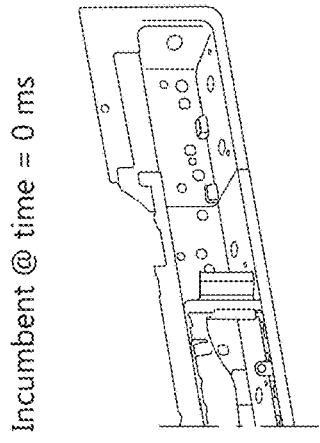
Fig. 9C
Hybrid solution with no metal insert @ time = 0 ms
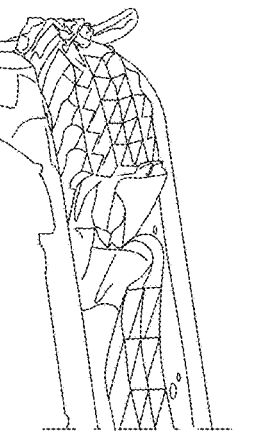
Incumbent @ time = 25 ms
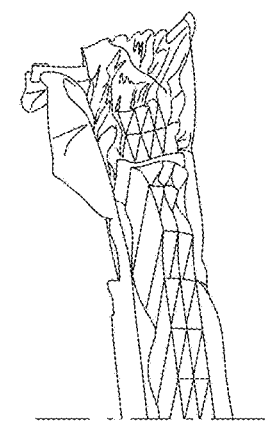
Proposed @ time = 25 ms
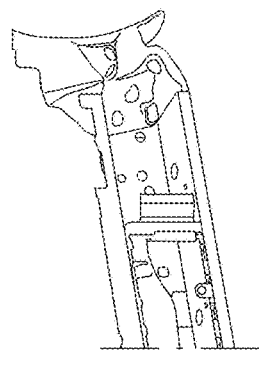
Hybrid solution with no metal insert @ time = 25 ms
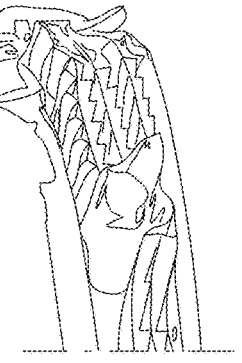
Incumbent @ time = 50 ms
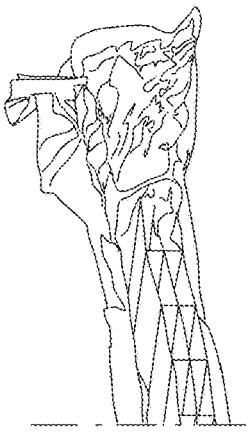
Proposed @ time = 50 ms
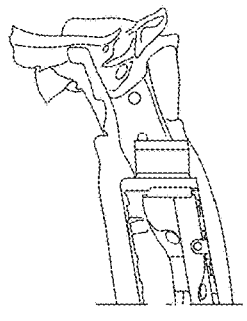
Hybrid solution with no metal insert @ time = 25 ms

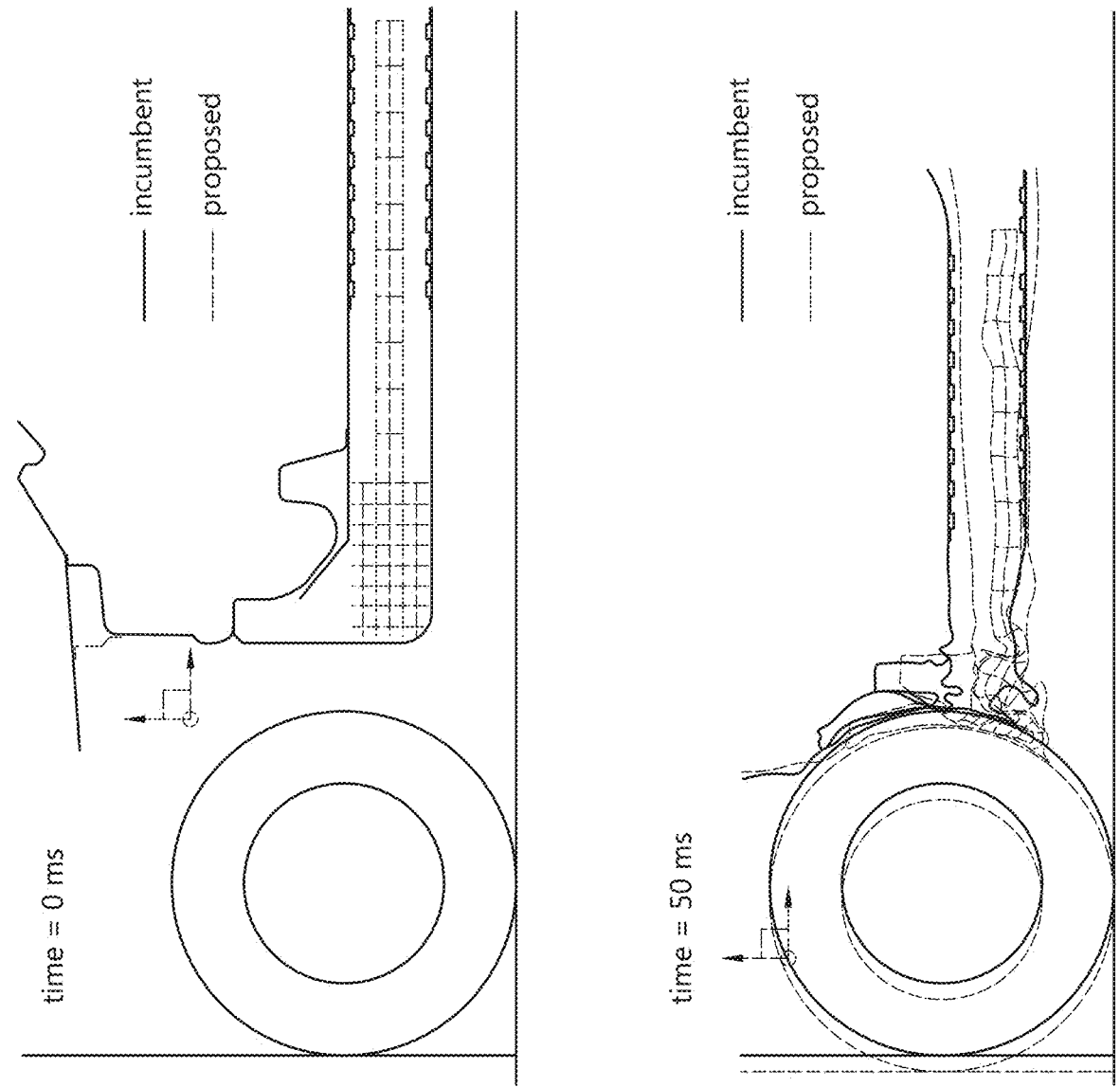

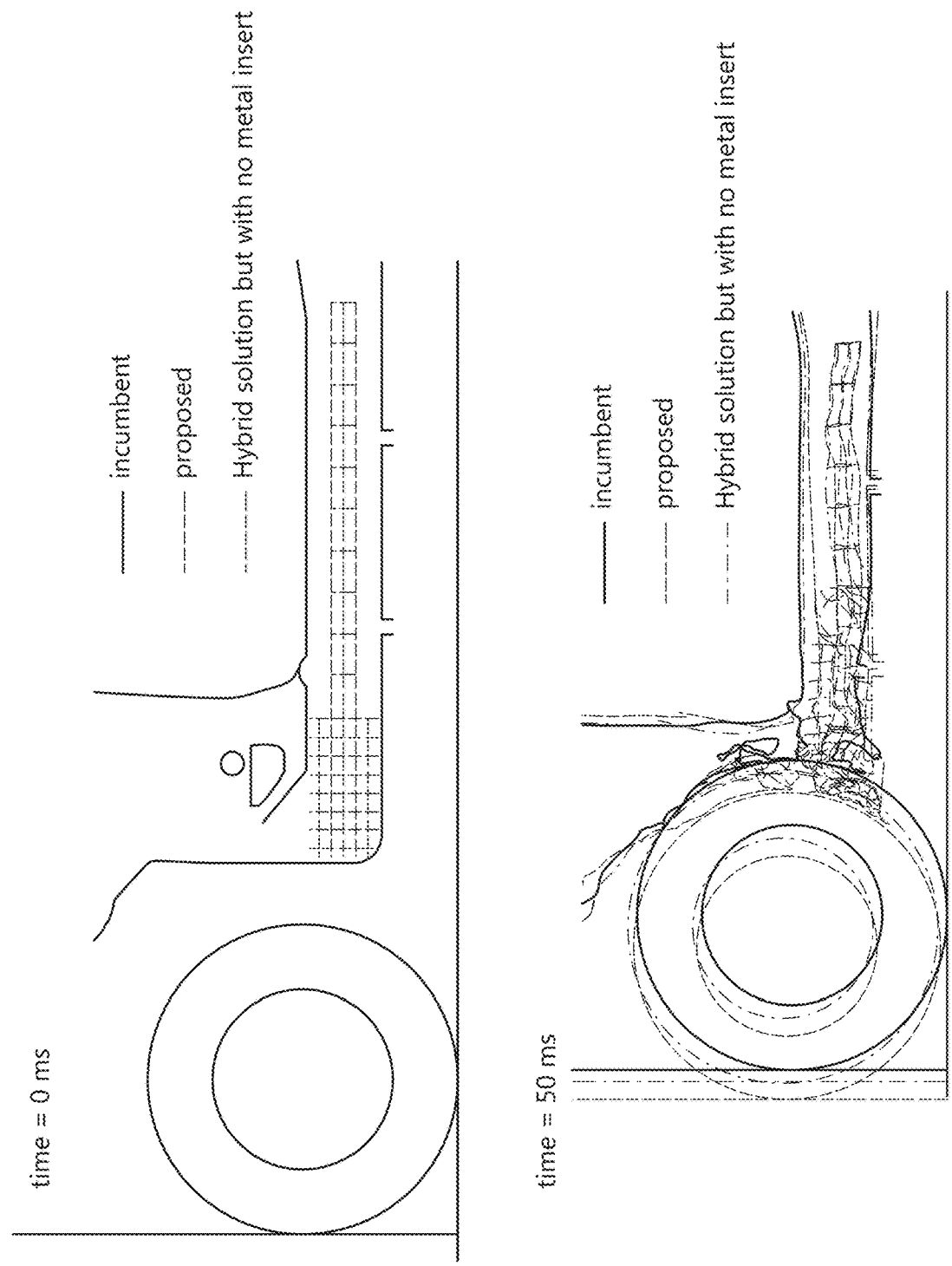

HYBRID ROCKER REINFORCEMENT FOR SMALL OVERLAP IMPACT

CROSS REFERENCE TO RELATED APPLICATIONS

This application is a National Stage application of PCT/EP2021/067082, filed Jun. 23, 2021, which claims the benefit of U.S. Provisional Application No. 63/043,782, filed Jun. 25, 2020, both of which are incorporated by reference in their entireties herein.

TECHNICAL FIELD

This document relates generally to automotive impact plastic reinforcements, and particularly to a metal plastic hybrid reinforcement for small overlap impact energy absorption.

BACKGROUND

Frontal vehicle crashes are the most common type of crash resulting in fatalities. Small-overlap vehicle collisions, also known as small overlap impacts or SOI, occur when the front corner of a vehicle collides with another vehicle or an object such as a tree or utility pole. These are one class of frontal vehicle crashes.

Passing a crash test for this type of collision can be challenging since most energy absorbing structures present in a vehicle are not engaged with the impactor since the overlap is small.

EP 2 655 169 B1 references a hollow metal rocker channel with plastic reinforcement located in the channel, but does not reference small overlap impact.

EP 2 945 838 B1 references a hollow structural vehicle rocker a channel, and a reinforcement comprising a plastic element having a honeycomb structure, and a support having greater than or equal to 3 walls forming a support channel, wherein the plastic element is located in the support channel, and wherein the reinforcement is located in the component channel, but does not reference small overlap impact.

EP 3 154 828 B1 references a polymer reinforcement structure comprising a polymer matrix and chopped fibers and a shell forming a shell channel and formed from continuous fibers and a resin matrix, wherein the polymer reinforcement structure is located in the shell channel, but does not reference small overlap impact.

EP 3 224 120 B1 references a variety of plastic reinforcements intended to address small overlap impact, but provides a limited teaching as to how to integrate components.

SUMMARY

The present subject matter provides an integrated rocker panel assembly that addresses both side impact and small overlap impact. A plastic reinforcement can be integrated into a rocker panel to absorb axial load from a small overlap impact and side impact energy. The package can be compact, lightweight, and provided additional capabilities over existing solutions, for example by managing the rate of axial deformation of the rocker panel assembly.

This Summary is an overview of some of the teachings of the present application and not intended to be an exclusive or exhaustive treatment of the present subject matter. Further details about the present subject matter are found in the detailed description and appended claims. Other aspects of the invention will be apparent to persons skilled in the art upon reading and understanding the following detailed description and viewing the drawings that form a part thereof. The scope of the present invention is defined by the appended claims and their legal equivalents.

BRIEF DESCRIPTION OF THE DRAWINGS

The drawings illustrate generally, by way of example, various embodiments discussed in the present document. The drawings are for illustrative purposes only and may not be to scale.

FIG. 2A is a perspective view of an inner rocker panel component including an all-metal reinforcement, according to an example.

FIG. 2B is a perspective view of an outer rocker panel component including an all-metal reinforcement, according to an example.

FIG. 3A is a top view taken along section 3A-3A of FIG. B and shows a rocker panel system including multiple plastic reinforcements and partitions, according to various examples.

FIG. 3B is a side view of the rocker panel system of FIG. 3A.

FIG. 3C is a side view of FIG. 3B.

FIGS. 9A-9C are panels showing frames of a deformation sequence of three different structures, according to some examples.

FIGS. 10A-10B are superimposed graphical depictions showing deformation of three different structures, according to some examples.

DETAILED DESCRIPTION

Figure 1:
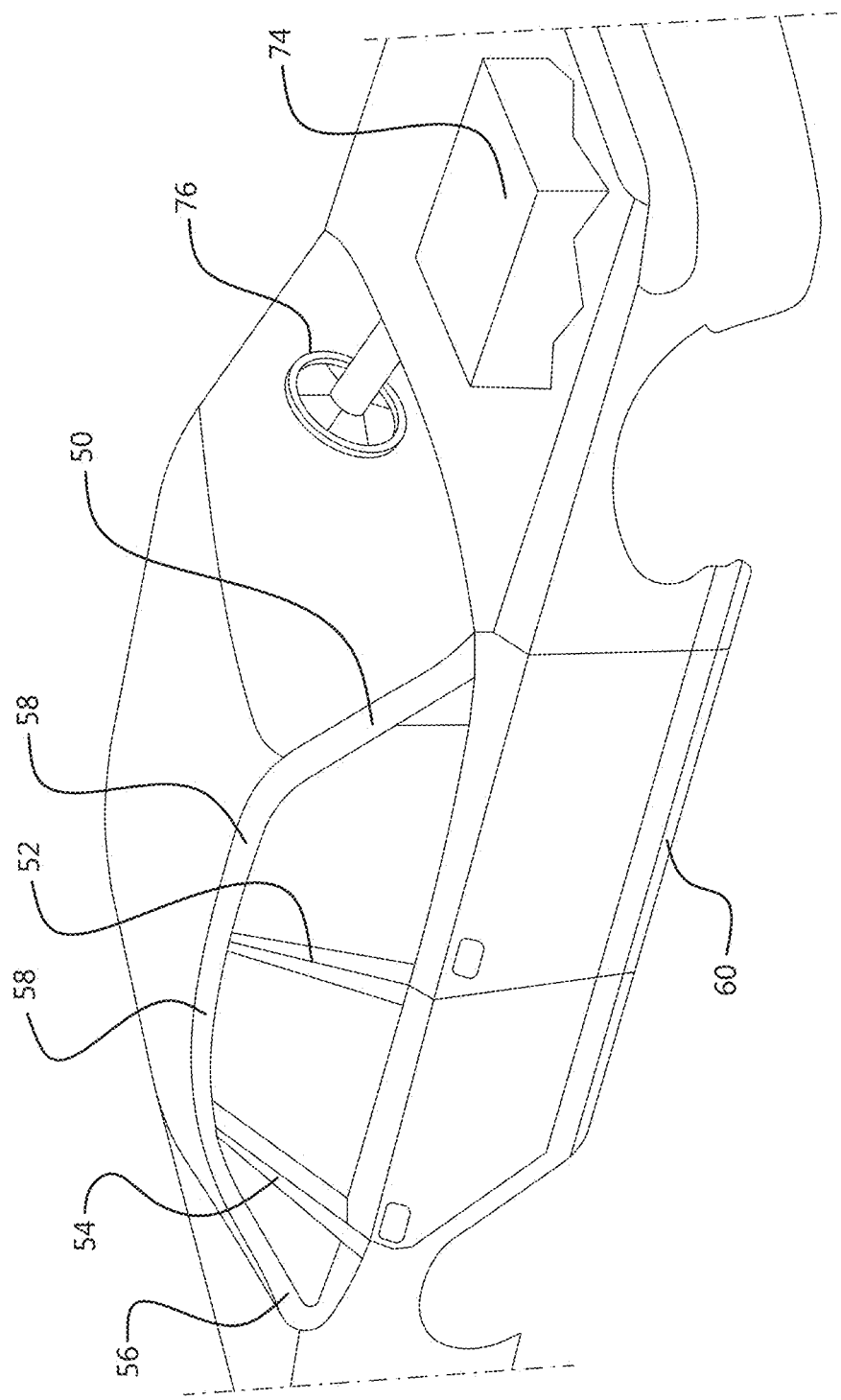
FIG. 1 is a partial perspective view of a vehicle.

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

It is estimated that approximately 25% of overall accidents correspond to small-overlap impacts ("SOI"). Current regulations may not adequately address this class of impact. Some testing bodies, (e.g., the Institute of Highway Safety ("IIHS")) have promulgated a test to address SOI. The test involves a 25% frontal overlap and 64 kilometers per hour (kph)/40 miles per hour (mph) impact of a vehicle with a rigid barrier.

Small overlap frontal collisions pose challenges for vehicle manufacturers since the main crush-zone structures presently available in vehicles are concentrated in the middle fifty percent of the front end of the vehicle. When a crash involves these structures, the occupant compartment of the vehicle can be protected from intrusion and front airbags and safety belts can effectively restrain and protect occupants. Small overlap frontal collisions are primarily directed to a vehicle's outer edges, which are not protected by the presently available crush-zone structures in vehicles. Forces from the collision go directly to the front wheel, suspension system, and firewall. The front wheel can be forced rearward into the footwell of the vehicle, contributing even more intrusion into the occupant compartment and resulting in serious leg and foot injuries.

As mentioned above, it is desirable to reduce the weight of a vehicle without compromising structural integrity and durability. Therefore, it is desirable to reduce the amount of metal employed in the vehicle while not sacrificing strength. Employed throughout the vehicle are hollow metal structural elements (e.g., beams, rails, pillars, rockers, bars, and so forth). The wall thickness of these various elements is sufficient to impart the desired structural integrity to that element to meet its desired function and various regulatory requirements until now.

It has been discovered that the thickness of the wall can be reduced, thereby reducing the weight of the component and hence the vehicle, while retaining the structural integrity of the element by using localized plastic reinforcement in the component. Disclosed herein, in various embodiments, is a plastic reinforced structural body of a vehicle, e.g., plastic reinforced metal parts defining lumens with plastic reinforcements disposed therein, for use on a motor vehicle. The device can include a deformable unit comprising a metal channel with one or more plastic reinforcements (e.g., localized plastic reinforcement). Essentially, localized plastic honeycomb reinforcement can be used to provide structural integrity to the hollow metal component.

To improve the crashworthiness of above-mentioned components of vehicle, a hybrid metal plastic solution, comprising channels with localized plastic reinforcement is disclosed herein. The disclosed crush countermeasure provides impact and/or reinforcement characteristics in a lighter weight structure as compared to prior systems composed entirely of metal. The crush countermeasure provides a lightweight crush system having comparable protection to current all metal systems. As such, the overall weight of a vehicle is reduced without any reduction in safety to passengers.

A more complete understanding of the components, processes, and apparatuses disclosed herein can be obtained by reference to the accompanying drawings. These FIGs. (also referred to herein as "FIG.") are merely schematic representations based on convenience and the case of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 is a partial perspective view of exemplary areas of the BIW that can be reinforced. For example, refer to FIG. 1, which illustrates the locations of the roof rail 58, "A" pillar 50, "B" pillar 52, "C" pillar 54, "D" pillar 56, and rocker 60. Disclosed herein are energy-absorbing devices, e.g., reinforcement for BIW components.

FIG. 1 is a pictorial representation of a vehicle. Plastic inserts can be located in one or any combination of the identified locations, including an A-Pillar 50, B-Pillar 52, C-Pillar 54, D-Pillar 56, roof rail 58, and rocker, as well as a prime mover 74 (e.g., engine or motor) and a steering wheel 76. For example, inserts that occupy about 10% to 30% of the length of the metal component can be located in A-Pillar 50, B-Pillar 52, the roof rail 58, and the rocker 60. The cross-section details shown in FIGS. 7A-D illustrate that two steel channels can be welded together to form a hollow component of the "body in white" with a plastic insert placed in the hollow space. The right location of these plastic inserts depends on crash worthiness performance for different high-speed impact requirements. As is clear from the illustrations (e.g., FIGS. 8A-C), the honeycombs can form channels. The channels can be oriented parallel to the main axis of the hollow space formed in the body in white component, orienting the channels perpendicular to the main axis of the hollow space formed in the body in white component provides further structural integrity.

FIG. 2A is a perspective view of an inner rocker panel component including an all-metal reinforcement, according to an example. FIG. 2B is a perspective view of an outer rocker panel component including an all-metal reinforcement, according to an example. The illustrated rocker panel components 202 and 204, commonly called a rocker panel, rocker system, or sill of a body-in-white (BIW) in an automobile, can perform multiple functions. One of its major functions is to absorb required amount of energy and minimize the intrusion and deceleration experienced by the occupant in the event of a side impact. For an electric vehicle, rocker components can serve as a primary side crash absorbing system, thereby preventing direct contact of surrounding parts with the battery pack. In many vehicles, a rocker component can serve as a longitudinal stiffening member, which comes in contact with rest of the vehicle parts and contribute substantially to minimizing the intrusion of the vehicle and resulting deceleration experienced by the vehicle. Rocker components in many vehicles should be able to absorb energy in the event of side impact as well should have sufficient longitudinal (or axial) stiffness. In order to achieve this, existing rockers 202 and 204 are made of multi-piece steel or aluminum solutions. Most of the current solutions are either focused on absorbing the energy before rocker comes into contact or focused on stiffening the rocker with single (steel or aluminum) material.

Rocker component 4, or inner all-metal rocker component, includes a stiffening member 5. Rocker component 204, or outer all-metal rocker component, includes a first metal reinforcement 3, a second reinforcement 2, and a third reinforcement 1. These all-metal rocker panels not only are undesirably heavy, they also offer limited options for tuning the deformation rate of the vehicle as it accommodates an impactor.

Many attempts have been made to provide body-in-white ("BIW") components for automotive vehicles, which are lighter and could be able to absorb a major portion of this impact energy during high-speed crashes. However, these solutions can be heavy, and they may not provide desirably tuned rate of deformation (or rate of change of rate of deformation). It would be beneficial to provide lightweight BIW components comprising crush countermeasures that are lighter than aforementioned solutions and provide ability to absorb more impact energy and/or protecting motor vehicle occupants. The crush countermeasures, e.g., energy absorbing devices, can improve structural integrity, for example, by reducing excessive deformation and improving crashworthiness during a vehicle crash scenario such as a SOI. It would also be beneficial to provide a crush countermeasure that may be easily manufactured and used in a motor vehicle without the use of additional processing steps.

In addition to the BIW components, reducing the weight while retaining the structural integrity of other vehicle components is also desired. The use of a vehicle energy absorbing system for a high-speed, small overlap impact can reduce the magnitude of forces on the front wheel, suspension system, and firewall during such a collision. The use of a vehicle energy absorbing system for a high-speed, small overlap impact can reduce the intrusion into the occupant compartment. The vehicle energy absorbing system can be located on a structural member, e.g., as part of a rocker panel system, in order to absorb or transfer energy or deflect the vehicle away from an impactor during a collision. Impactor refers to a rigid member such as another vehicle, pole, wall, tree, barrier, etc.

The present subject matter provides a lightweight and simplified rocker system meeting desired performance targets.

FIG. 3A is a top view taken along section 3A-3A of FIG. B and shows a rocker panel system including multiple plastic reinforcements and partitions, according to various examples. FIG. 3B is a side view of the rocker panel system of FIG. 3A. FIG. 3C is a side view of FIG. 3B.

Multi-piece rockers made of steel or aluminum, as disclosed in relation to FIG. 2, can be replaced with one or more of the components disclosed in FIG. 3 to provide a simplified and/or downgauged (i.e., formed of thinner metal) rocker system. The rocker system can include a panel component that is a single-piece metal over-molded panel component. The rocker system can include a panel component that includes a metal panel component reinforced with plastics that provide improvement in longitudinal stiffness. The component can increase in longitudinal stiffness and can contribute to a significant reduction in intrusion during small overlap impact, thereby offering a lighter solution with enhanced performance as an alternative to automotive manufacturers across the globe.

The rocker system 300 can include a rocker panel component 302. The rocker panel system 300 can include a second rocker panel component 342. The rocker panel component 302 and the second rocker panel component 342 can mate in a clamshell configuration. The rocker panel component can define a channel 304 extending along an axis 306. The rocker panel component 302 and the second rocker panel component 342 can define a lumen, with the channel disposed through the lumen or congruent with the lumen. The component 302 can include a partition 308. The partition 308 can be disposed in the channel 304 to define a first channel portion 310 and a second channel portion 312.

The first plastic reinforcement 314 can be adjacent to the partition 308, and can even abut the partition 308. Spacing may be maintained to control noise, vibration and harshness. One or more noise control components, such as a sound damper or body sealer, can be disposed between any of the partitions and plastic reinforcements disclosed herein. The reinforcements can be overmolded over the partition and/or the rest of the rocker component.

The partition 308 can be substantially planar. The rocker panel component 302 can be metal. The partition 308 can be metal. The partition 308 can be stamped into the rocker panel component 302. The partition 308 can be stamped out of a portion of the elongate base 330. The partition 308 can be welded to the rocker panel component 302. It can otherwise be joined, such as through adhesive joining, snap fit, or using some other technique or combination. The first wall 338 and the second wall 340 can be joined to the elongate base 330. Examples showing wall construction are disclosed in FIG. 7.

A first plastic reinforcement 314 can be disposed in the first channel portion 310. The first plastic reinforcement 314 can be coupled to the rocker panel component 302. Examples of coupling include, but are not limited to, adhesive, fastening (e.g., with Christmas trees), heat-staking, overmolding, and the like, including combinations thereof. The first plastic reinforcement can define a plurality of voids 316. The first plastic reinforcement can plastically deform under a load 318 at a first rate of deformation along the axis 306.

A second plastic reinforcement 320 can be disposed in the second channel portion 312. The second plastic reinforcement 320 can be coupled to the rocker panel component 302. The second plastic reinforcement 320 can define a plurality of voids 322. The second plastic reinforcement 320 can plastically deforms under the load at a second rate of deformation along the axis 306. The first rate of deformation can be different than the second rate of deformation. As such, one of the plastic reinforcements can plastically deform more quickly than the other.

Any number of plastic reinforcements can be provided in sequence, separated from one another by a partition. A third plastic reinforcement 324 can be disposed in a third channel portion 326. The third plastic reinforcement 324 can be coupled to the rocker panel component 302. The third plastic reinforcement 320 can define a plurality of voids 322. The third plastic reinforcement 324 can plastically deform under the load at a third rate of deformation along the axis 306. The first and/or second rates of deformation can be different than the third rate of deformation. As such, one of the plastic reinforcements can plastically deform more quickly than the other.

The rocker panel component 302 can be elongate, extending along axis 306. It can be formed of a metal, such as a stamped metal. It can have a base 330 with a first major face 328. The elongate base can have a second major face 332 which can be opposite the first major face 328. The elongate base can have a first edge 336 and a second edge 334 extending between the first major face 328 and the second major face 330. The rocker panel component 302 can include, optionally, a first wall 338 coupled to the first edge 336 and extending away therefrom at any angle, such as obtuse angle to define the channel 304, at least in part. The rocker panel component 302 can include includes a second wall 340 coupled to the second edge 334 and extending away therefrom at least an obtuse angle, to define the channel. The angle between the elongate base 330 and the first wall 334 and/or second wall 338 can be orthogonal.

The plastic reinforcement 314 can be molded to conform to the channel 304. It can be molded into the void of the first portion 310, so as to at least partially conform to the interior shape of the first portion 310. In some examples, the elongate base 330, first wall 338 and second wall 340 for a homogenous shell, and the plastic reinforcement can be molded into the shell. The shell can be formed of and/or reinforced by a unidirectional continuous-fiber tape, such as a glass-fiber reinforced polypropylene tape. The partition 308 can also form a part of the elongate base 330, such that the partition is homogenous with the elongate base 330. The elongate base 330, partition 308, first 338 and second 340 walls can be monolithic. The first wall 338 and the second wall 340 are omitted from FIG. 3A and FIG. 3B, to show optional configurations and improve the clarity of the figures.

In some configurations, a partition 346 can be is formed by one or more protrusions 348 that extend less than the entirety across the channel 304. A second partition 346 can be disposed in the channel 304 to define a third channel portion 326, with at least a third plastic reinforcement 324 disposed in the third channel portion 326. The third plastic reinforcement 324 can be coupled to the rocker panel component 302. The third plastic reinforcement 324 can define a plurality of voids or alveolar structures such that the third plastic reinforcement plastically deforms under the load at a third rate of deformation along the axis. The third rate of deformation is different than at least one of the first rate of deformation and the second rate of deformation.

A first benefit of the present subject matter is to provide a metallic or continuous-fiber composite rocker solution (e.g., for an automobile) whose inner or outer rocker panel component channel is overmolded with plastics along the longitudinal direction. This can contribute to an increase in longitudinal stiffness to offer improved crash resistance during a small overlap and/or offset high-speed crash of an automobile.

A second benefit of the present subject matter is to provide a plastic hybrid overmolded rocker with plastic alveolar structures in the rocker area closer to the front wheel of the car.

A third benefit of the present subject matter is to provide a hybrid rocker with reinforced and overmolded plastic which is supported by another bracket made of metal, composite or plastic which in turn is assembled via appropriate joining mechanism with the outer or inner rocker.

A fourth benefit of the present subject matter is to provide a rocker system with overmolded plastics arranged in honeycomb shape to take advantage of interaction between plastic walls for improved energy absorption and local stiffness along the longitudinal axis of the rocker.

The plastic reinforcements can comprise a metallic material, a polymeric material, a composite material, or a combination comprising at least one of the foregoing. The plastic reinforcements can comprise any polymeric material or combination of polymeric materials that can be formed into the desired shape and provide the desired properties. Exemplary materials include polymeric materials as well as combinations of polymeric materials with elastomeric materials, and/or thermoset materials. In one embodiment, the polymeric materials comprise thermoplastic materials. Possible polymeric materials include polybutylene terephthalate (PBT); acrylonitrile-butadiene-styrene (ABS); polycarbonate (LEXAN and LEXAN EXL resins, commercially available from SABIC's Innovative Plastics business); polyethylene terephthalate (PET); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX* resins, commercially available from SABIC's Innovative Plastics business); blends of polycarbonate/PET/PBT; PBT and impact modifier (XENOY resins, commercially available from SABIC's Innovative Plastics business); XENOY XHT; polyamides (Nylon 6, Nylon 6-6, Nylon 6-9, Nylon 6-10, Nylon 6-12, Nylon 11, Nylon 12, Nylon 4-6, etc.); phenylene sulfide resins; polyvinyl chloride PVC; high impact polystyrene (HIPS); polyolefins, e.g., low/high density polyethylene (L/HDPE), polypropylene (PP), expanded polypropylene (EPP); polyethylene and fiber composites; polypropylene and fiber composites (AZDEL Superlite sheets, commercially available from Azdel, Inc.); long fiber reinforced plastics (VERTON resins, commercially available from SABIC's Innovative Plastics business) plastic olefins (TPO), and carbon fiber reinforced polymeric composites (CFRP), as well as combinations comprising at least one of the foregoing.

An exemplary filled resin is STAMAX resin, which is a long glass fiber filled polypropylene resin also commercially available from SABIC's Innovative Plastics business. Some possible reinforcing materials include fibers, such as glass, carbon, and so forth, as well as combinations comprising at least one of the foregoing; e.g., long glass fibers and/or long carbon fiber reinforced resins. For example, carbon fiber reinforced polymeric composites can be utilized to form the plastic reinforcements. Carbon fiber reinforced polymeric composites can be used as a coating (e.g., skin) on the plastic reinforcements to provide the desired structural integrity to the plastic reinforcements. The plastic reinforcements can be formed from combinations comprising at least one of any of the above-described materials.

The plastic reinforcements can have a geometrical shape that can include a triangle, a cone, a pyramid, a cylinder, a square, a rectangle, a parallelogram, a trapezium, an ellipse, a hexagon, or a combination comprising at least one of the foregoing. For example, the plastic reinforcement can include a triangular pyramid, a square pyramid, a hexagonal pyramid, a triangular prism, a pentagonal prism, a hexagonal prism, a cube, a cuboid, a cone with a flat top, a pentagonal cone, a pentagonal pyramid, a pentagonal pyramid with a flat top, or a combination comprising at least one of the foregoing.

Disclosed are plastic reinforced structural components, which can be used to minimize damage suffered during an impact. The plastic (e.g., plastic) reinforced structural components comprise a metal component, such as the rocker pane component 302, surrounding a plastic reinforcement, such as the plastic reinforcement 314. The plastic reinforcement can be located throughout the structural component, that is along the channel 304, or in strategic locations within the structural component ("localized"), such as in the first portion 310, the second portion 312 or the third portion 326. The present subject matter focuses on the rocker panels, however elements of the structural body that can be reinforced using concepts disclosed hereunder include the beam(s), rail(s), pillar(s), chassis, rocker, cross-bar(s), and other hollow metal components, as well as combinations comprising at least one of the foregoing.

The plastic reinforcements can have an alveolar structure. Examples are shown in FIG. 8 Each can have its own unique alveolar structure. This can be referred to as "honeycomb" (e.g., an array of columns and channels). The combs of the structure can be any polygonal or rounded shape, such as circular, oval, square, rectangular, triangular, diamond, pentagonal, hexagonal, heptagonal, and octagonal geometries, as well as combinations comprising at least one of the foregoing geometries. Plastic honeycombs can be made by bonding extruded plastic tubes together, injection molding the plastic honeycombs, extruding the honeycomb structure, or otherwise formed. For example, the plastic reinforcement can be a co-extruded component having combs of the same or different material, e.g., adjacent combs can comprise a different material composition. Optionally, some or all of the combs have foam therein. In other words, the combs can, individually, be hollow or filled, such that the structural integrity can be modified by filling particular combs, by using different plastic for particular combs, or a combination comprising at least one of the foregoing. One possible fill material is foam.

The honeycombs' orientation with respect to the channels can also be adjusted to tune the energy absorption characteristics of the reinforced structural component (e.g., BIW). For example, the honeycomb can form channels that can be oriented 0 degrees (e.g., parallel) to 90 degrees (perpendicular), to the channel walls. In other words, in some embodiments, the honeycombs can have a common main axis with the hollow channel and extend parallel thereto. In other embodiments, the honeycombs can extend perpendicular to the main axis of the hollow channel.

Figure 4A:
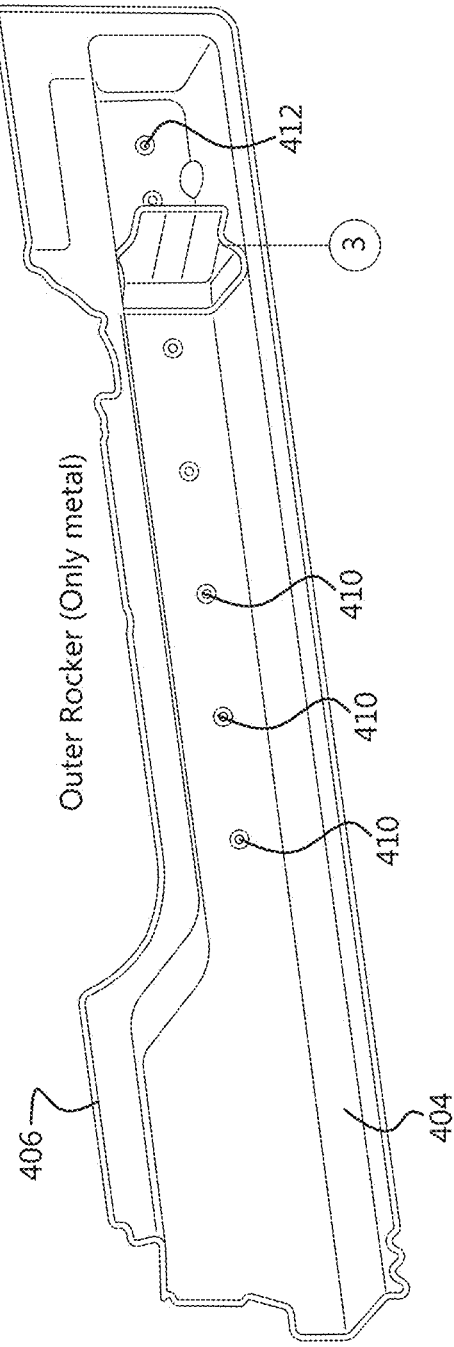
FIG. 4A is a perspective view of an inner rocker panel component including two plastic reinforcements, according to some examples.
Figure 4B:
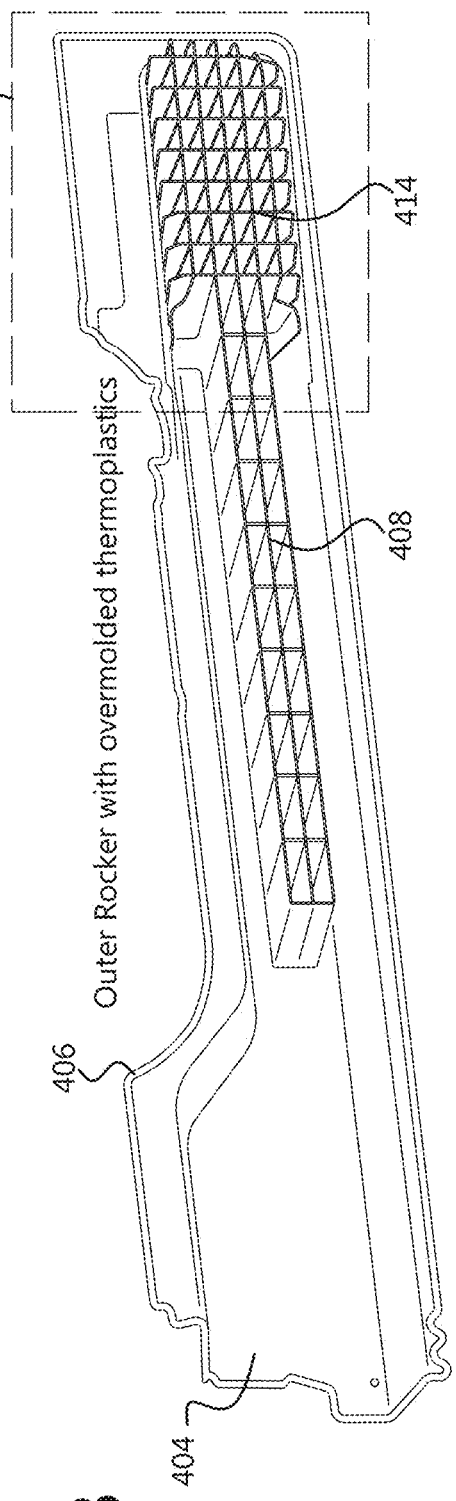
FIG. 4B is a perspective view of an outer rocker panel component including two plastic reinforcements, according to some examples.
Figure 5A:
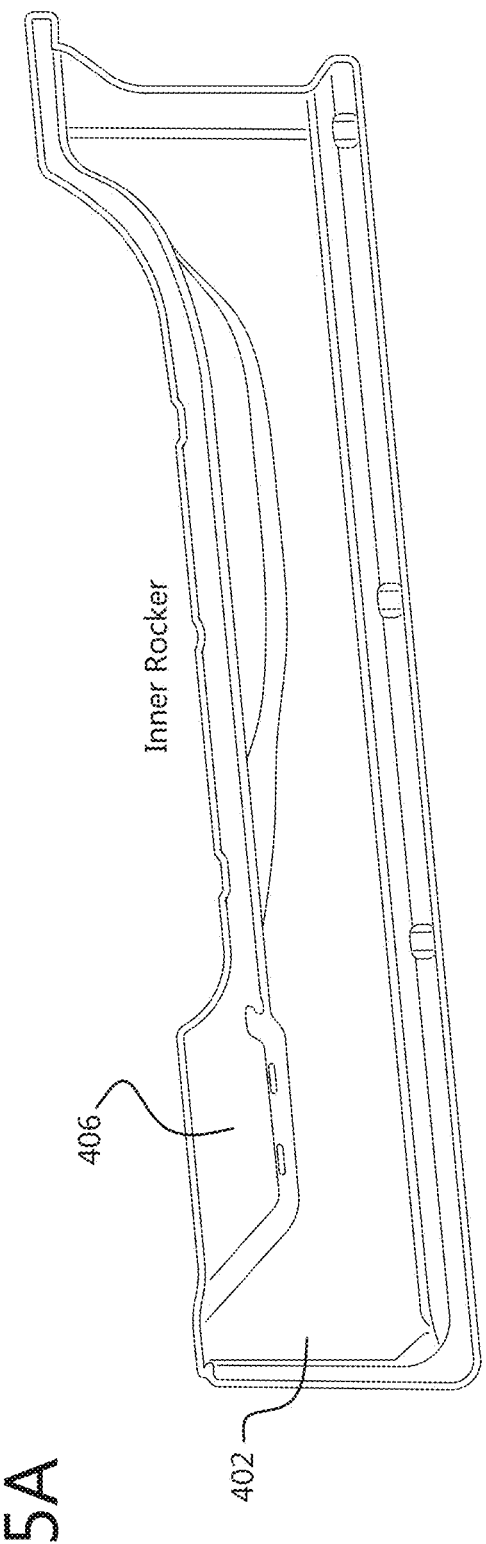
FIG. 5A is a perspective view of an inner rocker panel component including two plastic reinforcements, according to some examples.
Figure 5B:
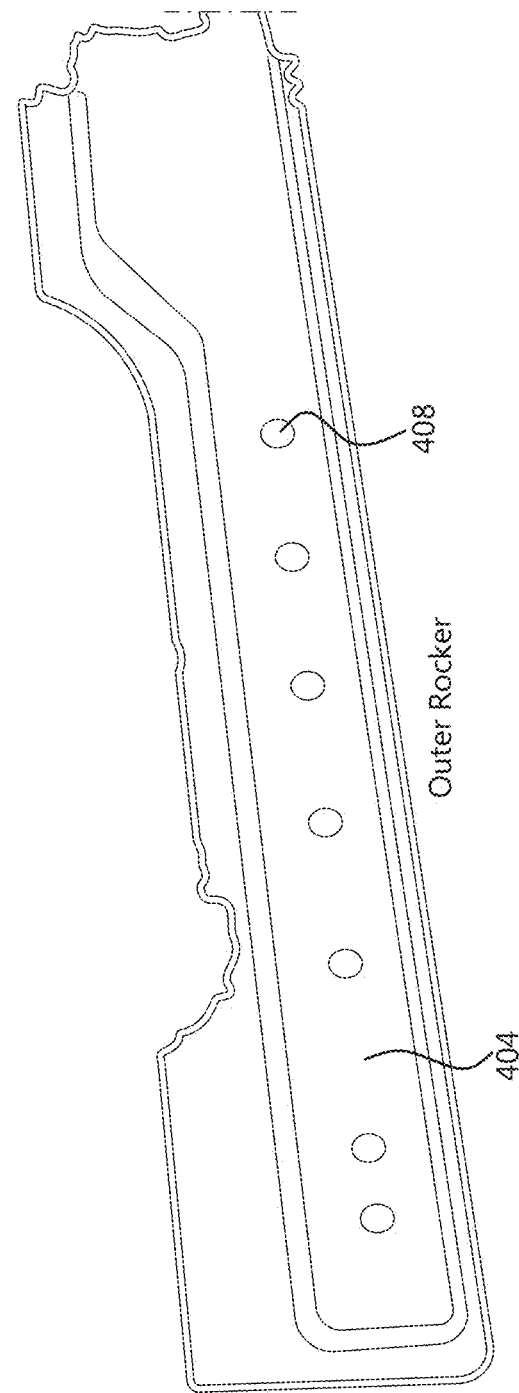
FIG. 5B is a perspective view of the opposite side of the component of FIG. 4B.
Figure 6:
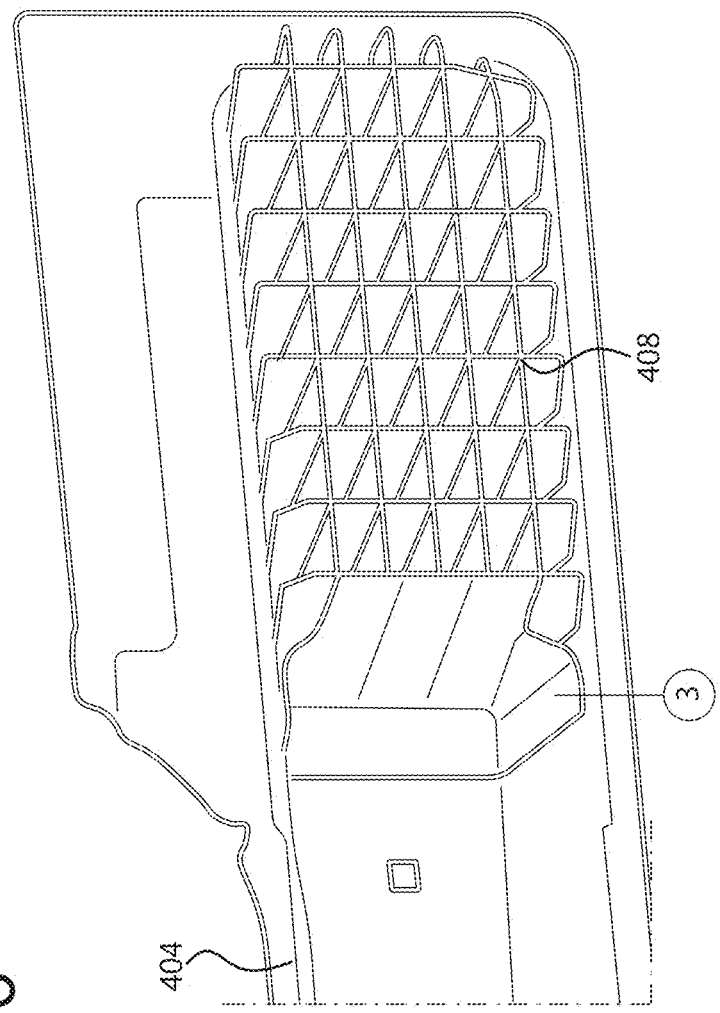
FIG. 6 is a cross section taken along line 6-6 in FIG. 4B, with one plastic reinforcement removed to show detail, according to some examples.

FIG. 4A is a perspective view of an inner rocker panel component including two plastic reinforcements, according to some examples. FIG. 4B is a perspective view of an outer rocker panel component including two plastic reinforcements, according to some examples. FIG. 5A is a perspective view of an inner rocker panel component including two plastic reinforcements, according to some examples. FIG. 5B is a perspective view of the opposite side of the component of FIG. 4B. FIG. 6 is a cross section taken along line 6-6 in FIG. 4B, with one plastic reinforcement removed to show detail, according to some examples.

A rocker panel system can include an inner rocker 402 and an outer rocker 404. The inner rocker 402 and the outer rocker 404 can be welded together, such as along flanges 406. Plastic reinforcement 408 can be overmolded on either of these. In some examples, plastic is molded on the outer rocker. It is worth noting that walls numbered 408 are the plastic material over molded to outer rocker 404 generating the mechanical interlocks between the metal and plastic.

A different view of the outer rocker is given in FIG. 5. A partition 410 provides an additional metal bracket that can be welded to the outer rocker 404 to provide support to the overmolded plastics to crush and absorb energy in the event of an axial crushing of the rocker, an example of which is illustrated in FIGS. 9 and 10. A closer look at how that gets assembled is shown in FIG. 6. It is worth noting that the honeycombs-type alveolar structures in this case are arranged in rectangular manner, but alternate arrangements such as hexagonal, triangular, pentagonal, octagonal etc. also can be used based on the stiffness requirements, and available packaging space. Examples are shown in FIG. 8.

In order to demonstrate the efficacy of the proposed hybrid solution, the conceived hybrid solution explained in FIGS. 4-6 are compared with a generic incumbent multi-piece rocker as shown in FIG. 2. As is clear from the FIG. 2, such a solution is typically composed of multiple steel stamped pieces welded together. In this particular case, it has five parts as represented by parts numbered 1 to 5 in FIG. 2. It is interesting to note that the rocker, in general, has two parts—the inner and the outer. In this example, the inner is made of one large piece 4 of steel stamped and formed structure with another reinforcement 5 welded to it as reinforcement. The outer rocker 204, on the other hand, is composed of three 1, 2 & 3 different steel forms welded together to form a structure capable of performing as desired. The inner and outer rocker are then welded together to form the complete rocker.

Returning to FIG. 4A, the outer rocker 406 can include a plurality of openings disposed in rocker panel component, and the first plastic reinforcement includes features disposed in at least some of the plurality of openings 410. The first plastic reinforcement 408 can include anchors that are over-molded into the openings 410, such that they extend from a first major face of the rocker panel component to a second major face, and flare out onto the second major face.

A second plastic reinforcement 414 can includes anchors that are over-molded into a second set of openings 412, such that they extend from the first major face to the second major face, and flare out onto the second major face.

The first and second plastic reinforcements may actually be a homogenous single piece, in which case each reinforcement is a portion. In such a case, the first portion may have an elongate shape and the second portion may have a shorter and wider shape. The pitch of the alveolar voids in each of the portions may be different such that the deformation rate of each portion is different.

In some optional configurations a plastic reinforcement can include fasteners to couple to openings, such that they extend from a first major face of the rocker panel component to a second major face, and flare out onto the second major face. The same can be true for a second plastic reinforcement.

As discussed elsewhere, at least one of the plastic reinforcements can be over-molded over a rocker panel component, such as a metal rocker panel component, or a rocker panel formed of some other material, such as STAMAX or thermoset carbon fiber.

This 5-piece solution weights ~18.7 kg per side. Proposed hybrid solution, on the other hand, weighs ~16.6 kg, thus offering a potential weight saving of 2.1 kg per side and 4.2 kg per vehicle. Both these solutions are assembled to a generic vehicle, and evaluated for its performance in the event a small overlap impact using a sub-system level model. It is worth noting that only the rocker parts, surrounding floor, BIW and firewall parts along with a rigid wheel are considered in the sub-system level numerical evaluation in which case a rigid barrier is allowed to hit the sub-system at a velocity of 54 km/h.

The length of the metal component is dependent upon the particular area of the BIW, while the length of the plastic reinforcement is dependent upon the amount and location of enhanced structural integrity in the metal component. The plastic reinforcement can have a length commensurate with the length of the metal component or less than the length of the metal component (e.g., can be localized; i.e., disposed only in a specific location to attain enhanced structural integrity of that location). Desirably, to maximize the weight reduction, the plastic reinforcement is localized so as to add the minimum amount of weight needed to attain a desired structural integrity (e.g., a structural integrity that this greater than or equal to the standard metal component without the thinner walls). In some embodiments, the plastic reinforcement has a length of less than or equal to 1,000 mm, specifically, less than or equal to 800 mm, and more specifically, less than or equal to 300 mm. In various embodiments, the length of the plastic reinforcement can be less than or equal to 80% of the length of the metal component, specifically, less than or equal to 60%, more specifically, less than or equal to 50%, and yet more specifically, 10% to 35% of the length of the metal component (i.e., the metal component that is reinforced by the plastic reinforcement). For example, in some embodiments the plastic reinforcement has a length of 150 mm to 350 mm, specifically, 200 mm to 250 mm, such as for use in a pillar or rail. In other embodiments, the plastic reinforcement has a length of 500 mm to 800 mm, specifically, 600 mm to 700 mm, such as for use in a rocker.

Figure 7A:
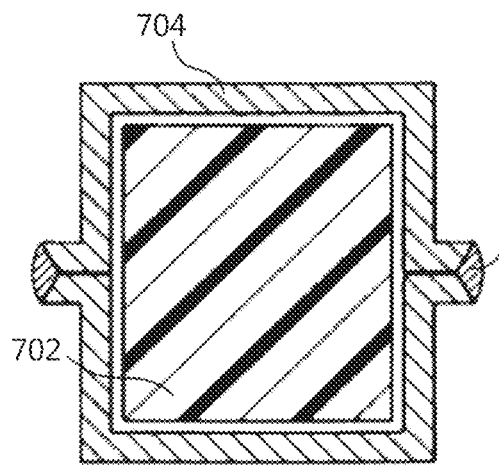
FIGS. 7A-7D are cross-sectional views of different embodiments of a reinforced BIW component.
Figure 7B:
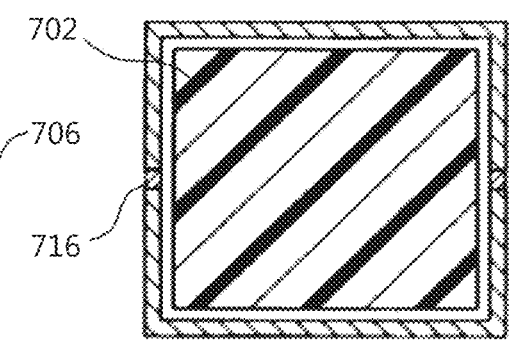
Figure 7C:
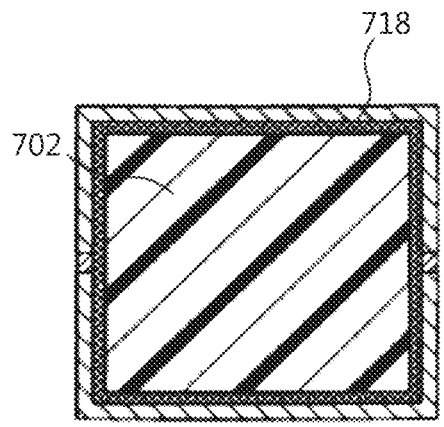
Figure 7D:
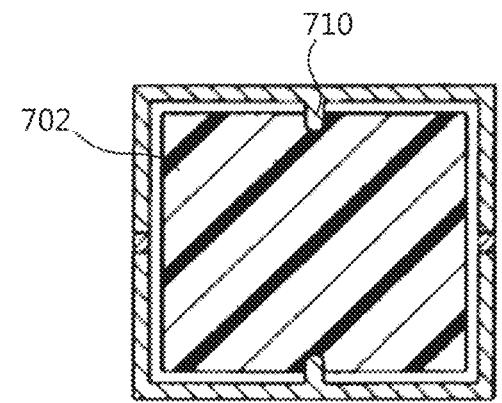

FIGS. 7A-7D are cross-sectional examples of a plastic reinforced structural component. As illustrated, the component can be welded (FIGS. 7A-7D), comprise a standard wall thickness (FIG. 7A), comprise thinner walls (FIGS. 7B-7D), comprise an adhesive to retain the plastic reinforcement in the component (FIG. 7C), and/or comprise a fixing measure (FIG. 7D).

Fixing measures to fix a plastic reinforcement to a wall can be mechanical and/or chemical. Exemplary mechanical fixing measures include locking element(s) (such as plastic (e.g., plastic extruded through an opening in the wall connecting the plastic reinforcement to the outside surface of the BIW component)), snaps, hooks, screws, bolts, rivets, welds, crimp(s) (e.g., the crimped metal wall), metal protrusions from the metal component wall to and/or into the plastic reinforcement (such as tabs or the like extending from the wall(s) into the channel to engage the plastic reinforcement), and the like. A friction fit can also be used to maintain the reinforcement in place.

Chemical fixing measures can include bonding agents such as glues, adhesives, and so forth. For example, the plastic component can be co-molded into the metal component such that some plastic passes into an opening through the metal wall and solidifies, bonding the components together. In another embodiment, the plastic reinforcement can be inserted into the metal reinforcement in a direction that allows the metal tabs to cantilever outward and spring back into place to engage the plastic reinforcement, inhibiting the removal thereof.

Optionally, the plastic reinforcement can comprise an engagement area (e.g., divot, indentation, hole, or the like) configured to engage the tab and further inhibit the separation of the metal component and plastic reinforcement. In some embodiments, the metal component can have a decreased size before and/or after the reinforcement such that the reinforcement cannot be moved (e.g., the reinforcement can be inserted into the metal component and the component can be crimped adjacent the reinforcement to inhibit the subsequent removal or movement of the plastic reinforcement).

In these FIGs, the plastic component 702 located within a channel of a metal component 704, wherein the metal component is held together with welds 706. The metal component can be thin 716. FIG. 7C illustrates an adhesive 718 attaching the plastic component 702 to the metal component 704, while FIG. 7D illustrate mechanical fixing measures 710 (e.g., snaps), retaining the plastic and metal components together.

The structural component can be a metal element having a hollow channel therein. The plastic reinforcement can be disposed in the channel. When the plastic reinforcement is not located throughout the whole channel, it can be attached to the metal to inhibit the plastic reinforcement from being dislodged during use of the vehicle or during an impact. Attachment of the plastic reinforcement and the metal element can be achieved using various mechanisms including bonding agents (FIG. 7C), welds (FIGS. 7A and 7B), fixing measures (FIG. 7D), as well as combinations comprising at least one of the foregoing.

Some possible metal component material(s) include aluminum, titanium, chrome, magnesium, zinc, and steel, as well as combinations comprising at least one of the foregoing materials. The thickness of the walls of the metal component can all be the same or can be different to enhance stiffness in a desired direction. For example, one set of opposing walls can have a greater/lesser thickness than the other set of opposing walls. In some embodiments, the metal components have a wall thickness of less than or equal to 1.6 mm, specifically, 1.0 mm to 1.5 mm, and more specifically 1.3 mm to 1.4 mm. Generally, metal walls (e.g., rocker, rails, pillars, bumper beam, and so forth), have a wall thickness of greater than 1.8 mm. Therefore, the use of the plastic reinforcement enables a reduction in wall thickness of greater than or equal to 10%, specifically, greater than or equal to 20%, and even greater than or equal to 25%.

Figure 8A:
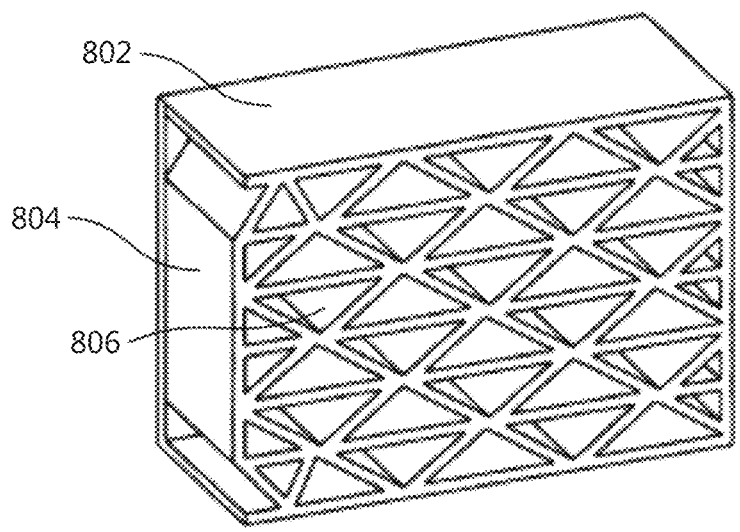
FIGS. 8A-8C are perspective views of various exemplary embodiments of plastic element of the hybrid reinforcement that can be employed in the BIW.
Figure 8B:
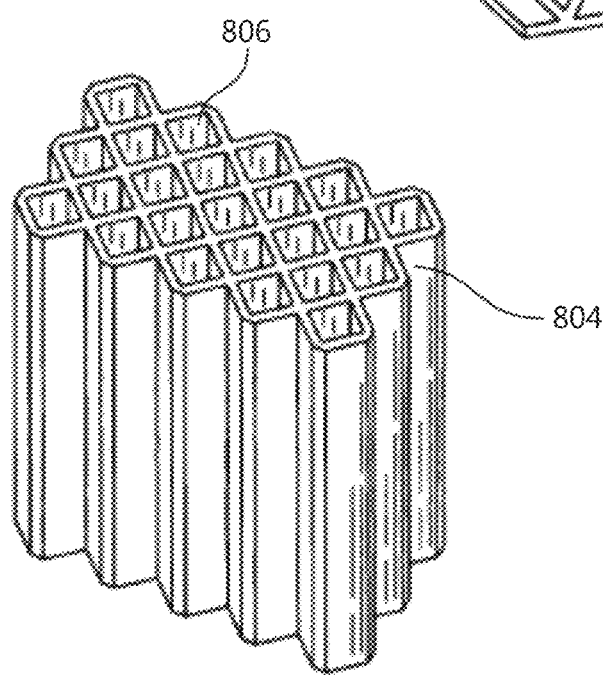
Figure 8C:
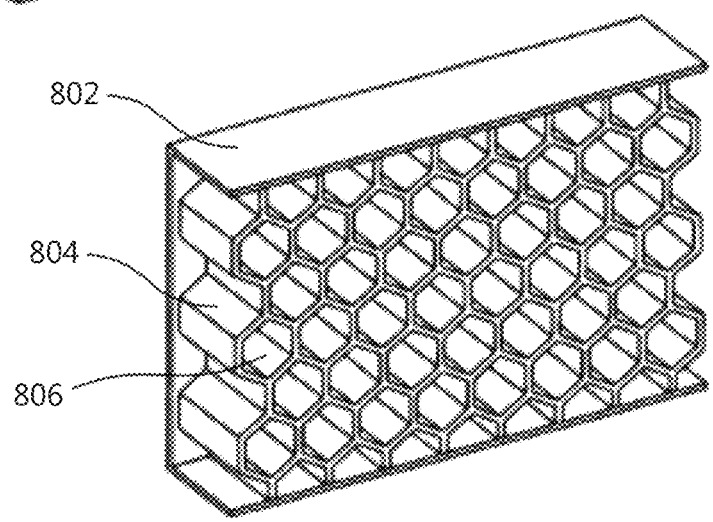

FIGS. 8A-8C are perspective views of various exemplary embodiments of plastic element of the hybrid reinforcement that can be employed in the BIW. A rocker panel component 802 defines a channel with a plastic reinforcement 804 disposed therein and conformed thereto, with the plastic reinforcement 804 defining alvcolar or voids. FIGS. 8A-8C illustrate exemplary designs of the plastic reinforcement, including some exemplary shapes for the combs thereof. Some exemplary designs for the plastic component include a layered structure comprising a plurality of layers of triangular structures (e.g., layers with diagonal ribs forming triangles; e.g., FIG. 8A), rounded comb structures (e.g., circular, oval, and so forth), polygonal comb structures (e.g., a hexagonal comb structure (e.g., FIG. 8C), four sided comb structure (e.g., FIG. 8B), pentagonal, and so forth), as well as combinations comprising at least one of the foregoing.

The overall size of the plastic reinforcement will be depending upon its location within the BIW and the size of the associate channel. Furthermore, the characteristics of the plastic reinforcement will depend upon the energy absorption characteristics desired in the particular area, e.g., the number of combs per unit area, the thickness of the comb walls, and the specific material of the plastic reinforcement. The density of combs (number of combs per unit area) is dependent upon the desired stiffness, crush characteristics, and materials employed. In some embodiments, the density can be 1 to 20 combs per 100 $mm^2$, specifically, 1 to 10 combs per 100 $mm^2$, and more specifically 1 to 5 combs per 100 $mm^2$. In various embodiments, the thickness of the walls of the plastic reinforcement can be 0.5 mm to 10 mm, specifically, 2 mm to 5 mm, and more specifically 2.5 mm to 4 mm.

Figure 11:
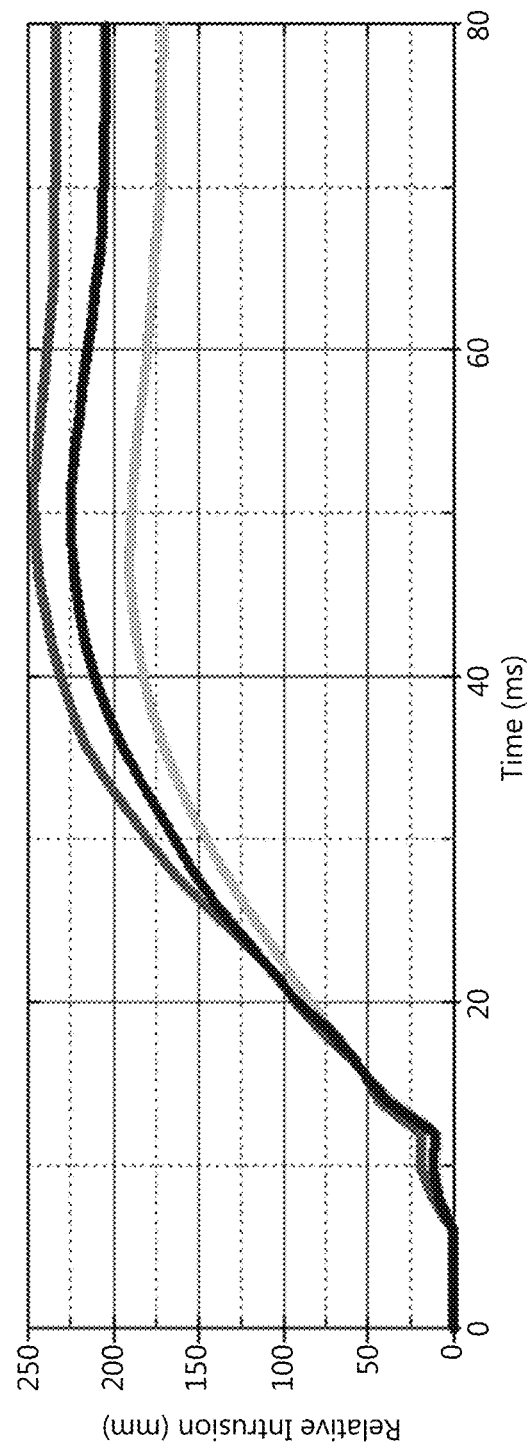
FIG. 11 shows relative intrusion over time of three different structures, according to some examples.

FIGS. 9A-9C are panels showing frames of a deformation sequence of three different structures, according to some examples. The FIGS. show local crash kinematics of both the system considered. As is shown, due to the presence of overmolded plastics, one rocker system offers increased crash resistance thereby reducing the overall collapse of the rocker. This subsequently reduces the overall intrusion experienced by the vehicle, thereby generating potentially increased survival space for occupant during small overlap or offset impact. This is also clear from FIG. 10, which demonstrates reduced intrusion in the rocker area in case of hybrid rocker solution. FIGS. 10A-10B are superimposed graphical depictions showing deformation of three different structures, according to some examples. FIG. 11 shows relative intrusion over time of three different structures, according to some examples.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

The invention claimed is:

1. An apparatus for providing structural support for a vehicle, the apparatus comprising:
a rocker panel component defining a channel extending along an axis;
a partition disposed in the channel to define a first channel portion and a second channel portion;
a first plastic reinforcement disposed in the first channel portion and coupled to the rocker panel component,
the first plastic reinforcement defining a plurality of alveolar voids such that the first plastic reinforcement plastically deforms under a load at a first rate of deformation along the axis;
a second plastic reinforcement disposed in the second channel portion and coupled to the rocker panel component,
the second plastic reinforcement defining a plurality of alveolar voids such that the second plastic reinforcement plastically deforms under the load at a second rate of deformation along the axis;
wherein the pitch of the plurality of alveolar voids in each of the first plastic reinforcement and the second plastic reinforcement is selected such that the first rate of deformation is different than the second rate of deformation.

2. The apparatus of claim 1, wherein
the rocker panel component has an elongate base with a first major face,
a second major face opposite the first major face,
a first edge and a second edge extending between the first major face and the second major face,
wherein the rocker panel component includes a first wall coupled to the first edge, and
the first wall extends away from the first edge at, at least, an obtuse angle to define the channel.

3. The apparatus of claim 2, wherein
the rocker panel component includes a second wall coupled to the second edge, and
the second wall extends away from the second edge at, at least, an obtuse angle, to define the channel.

4. The apparatus of claim 2, wherein
the angle between the elongate base and the first wall is orthogonal.

5. The apparatus of claim 1, wherein
the first plastic reinforcement abuts the partition.

6. The apparatus of claim 1, wherein
the rocker panel component is metal.

7. The apparatus of claim 1, wherein
a plurality of openings are disposed in the rocker panel component.

8. The apparatus of claim 1, wherein
at least one of the first plastic reinforcement and the second plastic reinforcement is over-molded over the rocker panel component.

9. The apparatus of claim 1, wherein
the partition is stamped into the rocker panel component.

10. The apparatus of claim 1, wherein the partition is formed of at least one protrusion extending away from the rocker panel component.

11. The apparatus of claim 1, comprising
a second partition disposed in the channel to define a third channel portion; and
at least a third plastic reinforcement disposed in the third channel portion and coupled to the rocker panel component,
the third plastic reinforcement defining a plurality of alveolar voids such that the pitch of the plurality of alveolar voids in each of the first plastic reinforcement, the second plastic reinforcement and the third plastic reinforcement is selected such that the third plastic reinforcement plastically deforms under the load at a third rate of deformation along the axis that differs from the first and second rates of deformation.

12. The apparatus of claim 11, wherein
the third rate of deformation is different than at least one of the first rate of deformation and the second rate of deformation.

13. An apparatus for providing structural support for a vehicle, the apparatus comprising:
a rocker panel component defining a channel extending along an axis;
a partition disposed in the channel to define a first channel portion and a second channel portion;
a first plastic reinforcement disposed in the first channel portion and coupled to the rocker panel component,
the first plastic reinforcement defining combs such that the first plastic reinforcement plastically deforms under a load at a first rate of deformation along the axis;
a second plastic reinforcement disposed in the second channel portion and coupled to the rocker panel component,
the second plastic reinforcement defining combs such that the second plastic reinforcement plastically deforms under the load at a second rate of deformation along the axis;
wherein a density of the combs in each of the first plastic reinforcement and the second plastic reinforcement is selected such that the first rate of deformation is different than the second rate of deformation.

14. The apparatus of claim 13, comprising a second partition disposed in the channel to define a third channel portion; and
at least a third plastic reinforcement disposed in the third channel portion and coupled to the rocker panel component,
the third plastic reinforcement defining combs, wherein a density of the combs is such that the third plastic reinforcement plastically deforms under the load at a third rate of deformation along the axis.

15. An apparatus for providing structural support for a vehicle, the apparatus comprising:
a rocker panel component defining a channel extending along an axis;
a partition disposed in the channel to define a first channel portion and a second channel portion;
a first plastic reinforcement disposed in the first channel portion and coupled to the rocker panel component,
the first plastic reinforcement defining a plurality of alveolar voids or combs such that the first plastic reinforcement plastically deforms under a load at a first rate of deformation along the axis;
a second plastic reinforcement disposed in the second channel portion and coupled to the rocker panel component,
the second plastic reinforcement defining a plurality of alveolar voids or combs such that the second plastic reinforcement plastically deforms under the load at a second rate of deformation along the axis;

wherein the pitch of the plurality of alveolar voids or a density of the combs in each of the first plastic reinforcement and the second plastic reinforcement is selected such that the first rate of deformation is different than the second rate of deformation, wherein at least one of the first plastic reinforcement and the second plastic reinforcement is over-molded over the rocker panel component, wherein the partition is stamped into the rocker panel component, and wherein the partition is formed of at least one protrusion extending away from the rocker panel component.

16. The apparatus of claim 15, comprising a second partition disposed in the channel to define a third channel portion; and at least a third plastic reinforcement disposed in the third channel portion and coupled to the rocker panel component, the third plastic reinforcement defining a plurality of alveolar voids or combs such that the third plastic reinforcement plastically deforms under the load at a third rate of deformation along the axis.

* * * * *